United States Patent [19]

Root et al.

[11] 4,025,981
[45] May 31, 1977

[54] APPARATUS FOR, AND METHOD OF, CLEANING A SELECTED SURFACE PORTION OF THE INTERIOR LINER OF A TIRE

[75] Inventors: Glenn M. Root, Snyder; Ronald G. Root, Glenwood; Richard A. Root, Williamsville, all of N.Y.

[73] Assignee: G.M. Root, Inc., Buffalo, N.Y.

[22] Filed: Oct. 30, 1975

[21] Appl. No.: 627,080

[52] U.S. Cl. .............................. 15/21 R; 15/97 R; 118/73; 118/317; 134/109; 134/123
[51] Int. Cl.² .................. A46B 13/04; B05C 11/00; B05B 13/06; B08B 3/00
[58] Field of Search ............... 15/21 R, 21 B, 21 E, 15/21 C, 21 D, 97 R; 157/13; 425/28 R; 118/72, 73, 44, 58, 306, 317, 318, 323; 134/109, 123

[56] References Cited

UNITED STATES PATENTS

| 1,471,787 | 10/1923 | Gammeter | 118/318 |
| 3,825,965 | 7/1974 | Root et al. | 15/21 D |
| 3,849,819 | 11/1974 | Sullivan et al. | 15/21 D |

Primary Examiner—Steven L. Stephan
Attorney, Agent, or Firm—Sommer & Sommer

[57] ABSTRACT

Apparatus for cleaning a selected surface portion of the interior liner of a tire includes a frame; three cooperative fingers adapted to be spread apart to engage the beads of a tire and to spread such beads proximate the portion of the liner to be cleaned; a brush; actuators arranged to move the brush into engagement with the liner portion; a rotary actuator arranged to spray solvent on to the liner portion; and a drain insertable into the tire to withdraw dirty solvent therefrom.

8 Claims, 4 Drawing Figures

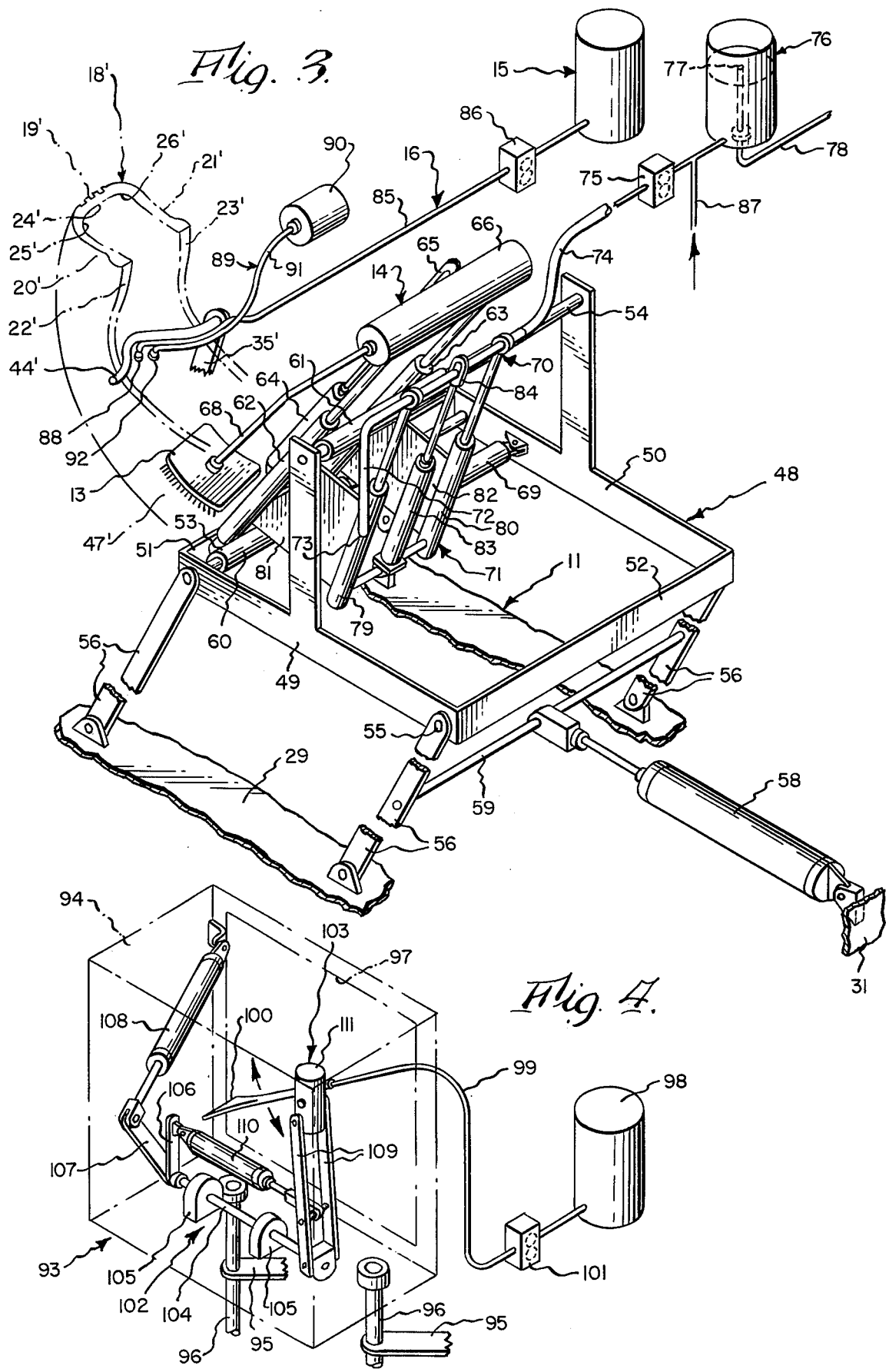

APPARATUS FOR, AND METHOD OF, CLEANING A SELECTED SURFACE PORTION OF THE INTERIOR LINER OF A TIRE

BACKGROUND OF THE INVENTION

1. Field of the Invention

The present invention relates generally to the manufacture and recapping of automobile and truck tires, and more particularly to apparatus for cleaning a selected surface portion of the liner of a tire in preparation for application of a weight patch or a weighted substance thereto.

2. Description of the Prior Art

After a tire has been manufactured or recapped, the tire may be passed through a Uniformity Correction Machine of the general type illustrated and described in an article "Drives and Bearings Round Out Tire Production," published on pages 55-59 of the September, 1974 issue of Power Transmission Design magazine.

Briefly, this Uniformity Correction Machine operates to spin balance the tire, determine the magnitude and location of the imbalance, and to grind the tire to attempt to bring it within acceptable balance limits.

However, grinding is not used to correct all imbalanced tires because the extent of grinding needed to bring some tires into balance would result in an out-of-round tire or would interfere with the cords thereof.

With such tires of large imbalance, it has been the practice to apply a weight patch or weighted dough to the light point of the tire to bring the tire within permissible balance limits.

However, before such patch or dough is applied, it is usually necessary to clean at least a selected portion of the tire liner of mold release agents remaining from the tire formation process so that the patch or dough will adhere to the tire liner.

One example of a machine to clean a tire liner is shown in U.S. Pat. No. 3,825,965, which discloses apparatus for cleaning the entire liner of a tire.

SUMMARY OF THE INVENTION

The present invention provides apparatus for, and a method of, cleaning a selected surface portion of the interior liner of a tire.

In the presently preferred embodiment, the apparatus minimally includes: a frame; first holding means mounted on the frame and selectively operable to hold a tire immovable and to spread the beads of the tire proximate the selected liner portion to be cleaned; a brush; brush moving means mounted on the frame and selectively operable to bring the brush into engagement with the selected liner portion and to move the brush relative to the selected liner portion while so engaged to scrub the selected liner portion; a source of cleaning solvent; supplying means selectively operable to withdraw solvent from the source and to supply such withdrawn solvent to the selected liner portion, whereby the brush may scrub the selected liner portion with the solvent to clean the selected liner portion.

The apparatus may further include a drain selectively operable to withdraw solvent accumulating at the bottom of the liner, and means mounted on the frame and selectively operable to insert the drain means into the tire.

The apparatus may further include drying means operatively arranged to discharge a flow of air onto the selected surface portion.

In the preferred form, the apparatus further includes second holding means selectively operable to hold a second tire immovable and to spread the beads of the second tire to expose the liner portion thereof to be cleaned.

The apparatus may, if desired, be provided with applying means mounted on the frame and selectively operable to apply a substance, such as a cement or a weighted dough, to the cleaned liner portion. The applying means may include a source of the substance, discharge means selectively operable to withdraw substance from the source and to discharge the withdrawn substance, means for selectively moving the discharge means into the tire so that the substance will be discharged on the cleaned liner portion, and means for translating the discharge means along the cleaned liner portion to distribute the discharged substance therealong.

The apparatus may be utilized to perform a method of cleaning a selected surface portion of the interior liner of a tire, which comprises the following steps: holding a tire immovable so that the selected liner portion is in a desired angular location above bottom dead center; spreading the beads of the tire proximate the liner portion to be cleaned; supplying solvent to the selected portion; and brushing the selected liner portion, thereby to clean the selected portion of the liner.

The method may further include any or all of the following additional steps: directing a flow of air onto the cleaned liner portion to dry the same; withdrawing solvent accumulating at the bottom of the tire liner; and/or discharging a substance from a nozzle on to the liner portion, and moving the nozzle along such liner portion during such discharge to distribute the discharged substance along the selected liner portion.

Accordingly, one general object of the present invention is to provide apparatus for cleaning a selected surface portion of a tire liner.

Another general object is to provide a method of cleaning a selected surface portion of a tire liner.

Another object is to provide apparatus for applying a coating to a cleaned portion of a tire liner.

Still another object is to provide apparatus for, and a method of, cleaning a selected liner portion so that a suitable weight or weighted substance may be applied to such liner portion to bring the tire within permissible balance limits.

These and other objects and advantages will become apparent from the foregoing and ongoing specification, the drawings and the appended claims.

BRIEF DESCRIPTION OF THE DRAWING FIGURES

FIG. 3 is an enlarged mechanical schematic perspective view of the carriage positioned to be proximate the second holding means, this view also depicting the brush, the brush moving means, the drain, the drain moving means, the source of fresh solvent, and the means for supplying solvent to the selected surface portion to be cleaned.

FIG. 4 is an enlarged mechanical schematic perspective view of the applying means, this view depicting the applying nozzle and the means for moving this nozzle in solid, and illustrating the enclosing box in phantom for clarity.

DESCRIPTION OF THE PREFERRED EMBODIMENTS

Figure 1:
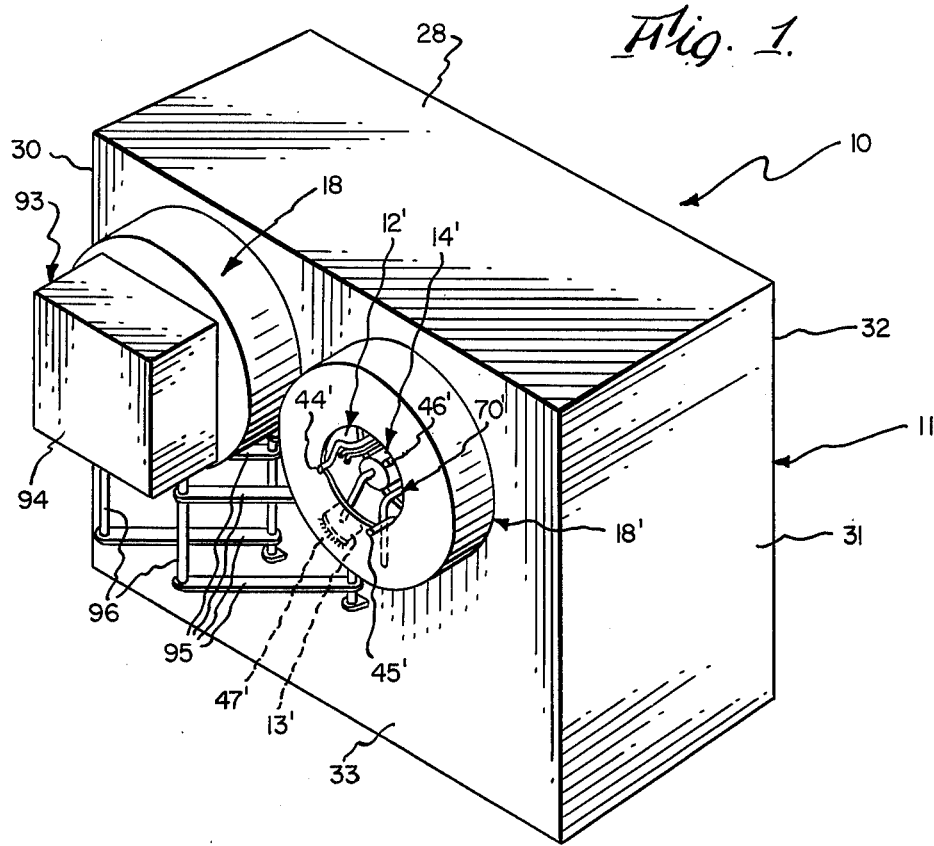
FIG. 1 is a perspective exterior view of the presently preferred embodiment of the apparatus, this view illustrating a tire being held by each of the holding means, the applying means positioned proximate the first holding means, and further illustrating the brush positioned to engage the selected surface portion of a tire held immovable by the second holding means.

At the outset, it should be clearly understood that like reference numerals are intended to identify the same elements and/or structure consistently throughout the several drawing figures, as such elements and/or structure may be further described or explained by the entire written specification of which this detailed description is an integral part.

Figure 2:
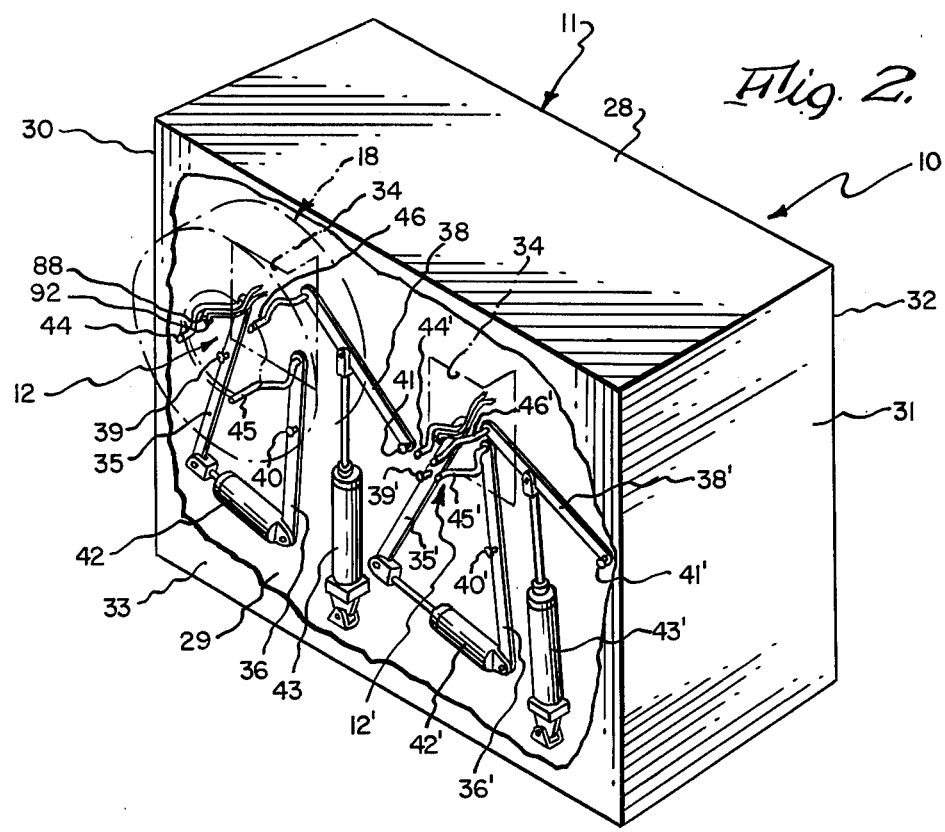
FIG. 2 is a perspective mechanical schematic view of the apparatus, this view being generally similar to FIG. 1 but with a portion of the frame front panel being broken away to illustrate the first holding means in an operative tire-engaging condition, and the second holding means in an inoperative or retracted condition ready to receive a tire.

Referring initially to FIGS. 1–3, the present invention provides apparatus, of which the presently preferred embodiment is generally indicated at 10, for, and a unique method of, cleaning a selected surface portion of the interior liner of a tire.

The inventive apparatus 10 is shown as minimally including a frame 11; first holding means, generally indicated at 12, mounted on the frame and selectively operable to hold a tire immovable and to spread the beads of this tire to expose the selected surface portion of the liner to be cleaned (FIG. 2); a brush 13 (FIG. 3); brush moving means, generally indicated at 14, mounted on the frame and selectively operable to bring the brush into operative engagement with the selected surface portion of the tire to be cleaned, and also operable to move the brush relative to the selected surface portion while so engaged to scrub the selected surface portion; a source of fresh cleaning solvent 15; and supplying means, generally indicated at 16, selectively operable to withdraw fresh solvent from the source 15 and to supply such withdrawn solvent to the selected surface portion.

In the preferred embodiment herein illustrated and described, the apparatus further includes second holding means, generally indicated at 12', mounted on the frame and selectively operable to hold another tire immovable and to spread the beads of this second tire to expose the selected surface portion of its liner to be cleaned. Inasmuch as the first and second holding means 12, 12' are structurally and functionally identical, only the first holding means will be explicitly described, it being understood that the same reference numeral primed will serve to identify the corresponding element of the second holding means.

Similarly, the tire depicted in association with the first holding means 12 is generally indicated at 18, and the other tire depicted in association with the second holding means 12' is generally indicated at 18'. Again these tires are structurally identical, the primed reference numerals merely distinguishing features of the second tire 18' from those corresponding features of the first tire 18. Adverting now to FIG. 3, it will be appreciated by those skilled in this art that the tire 18' typically has an outer peripheral tread portion 19', a pair of left and right side walls 20', 21' terminating in innermost beads 22', 23', and an internal liner 24' generally concentric with the tread portion 19' and extending between the left shoulder 25' and the right shoulder 26', these shoulders being severally defined by the intersection of a side wall with the liner. Of course, the tire 18 has the same portions as tire 18'.

In FIGS. 1 and 2, the frame 1 is depicted as being a horizontally-elongated rectangular box-like structure having horizontal top and bottom panels 28, 29; vertical left and right end panels 30, 31; a vertical back panel 32; and a forwardly-facing vertical front panel 33 provided with a pair of horizontally-spaced through openings, these openings being shown in phantom in FIG. 2 and severally indicated at 34.

Referring now particularly to FIG. 2, the first holding means 12 is shown as including a left lever arm 35 pivotally mounted on the frame front panel 33 at an intermediate portion of its length, a middle lever arm 36 also pivotally mounted on the frame front panel 33 at an intermediate portion of its length, and a right lever arm 38 having its right marginal end portion pivotally mounted on the frame front panel 33. The pivot points of the left, middle and right lever arms are indicated at 39, 40 and 41, respectively. The lower marginal end portions of the left and middle lever arms 35, 36 are connected by a suitable actuator 42 which may be selectively operated to spread these lower marginal end portions, or draw them together, as desired. The lower cylinder of another suitable actuator 43 is shown as being pivotally mounted on the frame bottom panel 29, with the upper marginal end portion of its extensible rod being pivotally connected to an intermediate portion of right lever arm 38. Thus, this actuator 43 may be selectively operated to cause right lever arm 38 to swing about its pivotal connection 41 with the frame front panel 33.

Still referring principally to FIG. 2, a finger 44, 45 and 46 is shown as extending forwardly from the upper marginal end portion of each of the lever arms 35, 36 and 38, respectively. Each of these fingers has a rear shank portion joining the associated lever arm, an intermediate V-shaped portion having its apex pointed outwardly, preferably in a radial direction, with respect to a tire to be mounted thereon, and an outermost or forward shank portion.

Thus, actuators 42 and 43 may be selectively operated to move these fingers to retracted positions proximate one another, this condition being depicted for the second holding means 12' in FIG. 2, or may be selectively operated to spread these fingers away from one another to engage the beads of a tire, this condition being depicted for the first holding means 12 in FIG. 2. One unique feature of the holding means 12, 12' is that the fingers may accommodate and hold different sizes of tires, such as the different sizes commonly used as automobile and truck tires.

Another unique feature of these three cooperative fingers 35, 36, and 38 is that the V-shaped portions thereof will act as inclined planes to spread the beads of the tire to more fully expose the selected portion of the tire liner to be cleaned. In the presently preferred embodiment, the selected portion of the liner to be cleaned, generally indicated at 47, may lie generally in the 6:00 o'clock to 9:00 o'clock position as one faces the tire, so that solvent will drain down from such selected surface portion toward the bottom dead center position of the liner. Of course, persons skilled in this art will recognize that the structure of the holding means may be modified or repositioned, as desired, so that the first and second fingers 44, 45 are arranged proximate the liner selected portion, and the third finger 46 is positioned generally opposite these two fingers. In this manner each of the first and second holding means 12, 12' is mounted on the frame and is selectively operable to hold a tire immovable such that a selected liner portion to be cleaned is in a desired angular location, preferably above bottom dead center, and is further operable to spread the beads of such tire proximate the selected liner surface portion to be cleaned.

Referring now to FIG. 3, a carriage, generally indicated at 48, is mounted within the frame 11 to support the brush 13 and the brush moving means 14. This carriage 48 is shown as including spaced front and rear inverted T-shaped plates 49, 50 joined by horizontally-elongated left and right cross plates 51, 52. A left slide rod 53 is shown as extending between and penetrating the left marginal end portions of carriage plates 49, 50; an upper slide rod 54 is shown as extending between and penetrating the upper marginal end portions of carriage plates 49, 50; and a right slide rod 55 is shown as similarly extending between and penetrating the right marginal end portions of these carriage plates. The carriage 48 is supported on the frame by four legs, severally indicated at 56. Each of these legs 56 has its upper marginal end portion pivotally connected to a carriage slide rod proximate a corner of the carriage, and has its lower marginal end portion pivotally mounted as the frame bottom 29, as shown in FIG. 3. Thus, when viewed from the front, the base of the carriage front plate 49 appears as the upper horizontal parallel leg of a parallelogram-type linkage. An actuator 58 is arranged to act between the frame right end panel 31 and a transverse rod 59, connecting the two right legs. This actuator 58 may be selectively operated to move the carriage 48 between a first or left position proximate the first holding means 12, and a second or right position proximate the second holding means 12', for a purpose hereinafter explained.

The brush moving means 14 is shown as being mounted on carriage 48, and generally includes a left sleeve 60 slidably mounted on the left slide rod 53; an upper sleeve 61 slidably mounted on the upper slide rod 54; a pair of upwardly and rightwardly-inclined front and rear extensible guides 62, 63 suitably mounted on the sleeves 60, 61; an upwardly and rightwardly inclined actuator 64 similarly mounted on the sleeves between the guide rods and having a rod eye 65 at the upper end of its extensible arm; an oscilating rotary actuator 66 carried by the extensible guides 62, 63 and moved by actuator 64 through the intermediate rod eye 65; and an L-shaped arm 68 arranged between the actuator 66 and the brush 13. The entire brush moving means 14 constitutes a slide assembly which may be moved forwardly or rearwardly on the carriage 48 by means of an actuator 69 suitably secured to the carriage back plate 50 and one of the slide assembly elements. Thus, the actuator 69 may be selectively operated to move the entire slide assembly, including brush 13, forwardly toward a tire, or rearwardly away from a tire.

Still referring to FIG. 3, the apparatus may further include drain means, generally indicated at 70, selectively operable to withdraw solvent accumulating at the bottom of the tire; and drain moving means, generally indicated at 71, mounted on the frame and selectively operable to insert the drain means into a tire. In the presently preferred embodiment, the drain means 70 includes a conduit having a forwardmost inverted L-shaped pipe section 72 having an open lower end 73, a flexible conduit 74 communicating with the upper rear end of pipe section 72, a pump 75 operatively arranged in the conduit and communicating with accumulator means 76. The pump 75 may be selectively operated to draw solvent in through the open end 73 of pipe 72 and to pump such solvent into the accumulator means 76. The accumulator means 76 comprises a storage tank provided with an overflow opening 77 at a desired level and communicating with a vent line 78 leading to discharge or waste storage. In the preferred embodiment, the volumetric storage capacity of the accumulator means is a fraction of the total amount of solvent pumped out of a tire.

It should also be noted that the present invention expressly contemplates that the pump 75 may be reversely operated to pump the retained solvent from the accumulator means 76 back through the drain opening 73 to quickly flood the next sequential tire to be cleaned. If desired, the drain conduit 74 may further include means, generally indicated at 87, for injecting or supplying a cleaning agent, such as soap, into the drain line.

The drain moving means 71 is shown as including a pair of extensible guides 79, 80 suitably secured to the slide assembly by a pair of plates 81, 82 and operatively connected to pipe section 72, and an actuator 83 arranged to act on the slide assembly and having a rod-eye 84 at its upper connection with pipe section 72. Thus, actuator 83 may be selectively operated to move the pipe section 72 upwardly or downwardly, as desired.

The supplying means 16 includes a conduit 85 arranged to withdraw clean or fresh solvent from the source 15 thereof, this source being depicted schematically as a tank; a pump 86 operatively arranged in conduit 85 to withdraw solvent from the source 15; and a spray nozzle 88, mounted on finger 44' and operatively arranged in the conduit to discharge or spray pumped solvent on the liner portion to be cleaned. If desired, drying means 89 may be provided to facilitate evaporation of the solvent from the cleaned portion. In FIG. 3, the drying means may simply include a source of compressed air 90, and a conduit 91 terminating in a nozzle 92 mounted on finger 44'. The drying means may be selectively operated to discharge a jet-like flow of air on the liner portion, as desired. Of course, such discharged air may be heated, if desired.

Referring now to FIGS. 1 and 4, the apparatus may further include applying means, generally indicated at 93, mounted on the frame and selectively operable to apply a substance, such as "dough" or cement, on the cleaned surface portion. As best shown in FIG. 4, the applying means 93 is contained within a rectangular box-like structure 94 suitably mounted on the frame front panel 33 by four legs, severally indicated at 95 (FIG. 1), pivotally connected to the frame front panel 33 and to vertical rods 96 depending from the bottom of the enclosing box 94. Thus, the legs 95 form another parallelogram-type linkage to enable the enclosing box 94 to be selectively moved between a first or left position proximate the first holding means, and a second or right position proximate the second holding means.

Still referring principally to FIG. 4, the rear face of the enclosing box 94 is shown provided with a large opening 97. The applying means 93 is shown as including a source 98 of a coating, a conduit 99 communicating with this source and having a discharge nozzle 100 at its distal end, and a pump 101 arranged in conduit 99 and selectively operable to withdraw substance from the source 98 and to discharge such withdrawn substance through nozzle 100. The applying means 93 is shown as further including means, generally indicated at 102, for selectively moving the discharge nozzle into a tire so that the substance will be discharged on the selected cleaned portion thereof and means, generally indicated at 103, for translating the discharge nozzle along the cleaned selected portion.

The means 102 is shown as including a rotatable shaft 104 suitably journalled in a pair of pillow blocks 105 mounted on the bottom of enclosing box 94, a first arm 106 mounted fast on the left marginal end portion of shaft 104 and extending upwardly therefrom in a radial direction, a second arm 107 also mounted fast on the left marginal end portion of shaft 104 and extending forwardly and upwardly therefrom, an actuator 108 pivotally connected to the front panel of box 94 and to the upper end of arm 107 and selectively operable to rotate shaft 104, a pair of parallel third arms 109 having their lower marginal end portions pivotally connected to the right marginal end portion of shaft 104 to rotate therewith, and an actuator 110 pivotally connected to the upper end of arm 106 and to a cross-piece extending between arms 109, 109 and selectively operable to cause the third arms to move pivotally about their lowermost connection with shaft 104.

In this preferred embodiment, the means 102 may simply comprise an oscilating rotary actuator 111 which is selectively operable to translate the discharge nozzle along the length of the selected portion.

Thus, actuator 108 may be selectively operated to rotate shaft 104 and cause the rotary actuator 111 to swing into or out of the enclosing box 94. Actuator 110 may be selectively operated to cause the rotary actuator 111 to pivot in a plane including shaft 104, and the rotary actuator 111 may be selectively operated to translate or move the nozzle along the length of the cleaned selected surface portion.

Operation

To clean a tire, the operator must first operate the actuators 42, 43, or 42', 43', of one of the holding means 12 or 12' to cause the fingers thereof to move to the retracted position, this condition being shown by the position of the fingers of the second holding means 12' in FIG. 2.

Thereafter, the operator may place a tire on the retracted fingers such that the selected portion to be cleaned is in the desired angular location, and may selectively operate actuators 42, 43, or 42', 43' to cause the fingers of the holding means to spread or expand to engage and spread the beads of the tire.

In the preferred embodiment, the operator may selectively operate carriage-moving actuator 58 to move the carriage 48 to the position proximate the holding means upon which the tire has been mounted.

Thereafter, slide assembly actuator 69 may be selectively operated to cause the slide assembly to move forwardly so that the brush 13 and drain 73 will be positioned over the tire liner.

Drain actuator 83 and brush actuator 64 may be selectively operated to lower the drain and brush downwardly into engagement with the liner, the rod eyes 84 and 65 being effective to insure that the drain and brush will be urged into engagement with the tire liner only by the weight of these elements.

Thereafter, pump 75 may be reversely operated to flood the tire liner through drain opening 73 with dirty solvent stored in tank 76. Oscillating brush actuator 66 may then be selectively operated to impart a rotary oscillating scrubbing action to brush 13 to scrub the selected portion.

Before this scrubbing action has been completed, pump 75 may be operated to pump dirty solvent accumulating or collecting in the bottom of the liner into the accumulator 76. As this pumping operation is being carried out, the solvent pump 86 may be operated to pump fresh solvent from the tank and spray such fresh solvent on the selected tire portion being cleaned, such sprayed solvent draining downwardly toward the bottom of the liner, at which position it is removed by the drain means.

One feature of the invention is that only a fractional portion of the total amount of dirty solvent and clean solvent used to clean the tire, may be stored in the accumulator, the additional amount of such solvent flowing through accumulator drain 77 and thence to discharge or storage through conduit 78.

After the brush has sufficiently scrubbed the selected tire portion, brush actuator 66 may be selectively stopped, and actuator 64 may be extended to raise and withdrawn the brush from the tire. Desirably, fresh solvent is still sprayed on the selected liner portion to rinse the same. Thereafter, the remaining solvent collecting in the bottom of the tire is pumped out by the drain means, and the air pump 90 is selectively operated to discharge a jet of air on the cleaned surface portion to dry the same. During this drying operation, the actuator 83 may be selectively extended to raise and withdraw the drain from the tire. Then, actuator 69 may be selectively operated to move the entire slide assembly rearwardly with respect to the carriage.

If it is desired to mechanically apply the coating to the cleaned liner portion, the applying means 93 may be initially moved to a position proximate the tire. Thereafter, actuator 108 may be selectively operated to rotate the nozzle 100 out of the enclosing box 94 to a position above the tire, and actuator 110 may be selectively operated to pivotally lower the nozzle 100 downwardly into the tire. Thereafter, pump 101 may be operated to discharge, spray or extrude the substance through nozzle 100 onto the cleaned liner portion, and rotary actuator 111 may be selectively operated to translate or move this nozzle along the tire selected portion to distribute the discharged substance therealong.

Finally, holding means actuators 42, 43 may be selectively operated to move the fingers to the retracted position, thereby releasing the tire.

Accordingly, the apparatus herein disclosed may be used to perform a method of cleaning a selected surface portion of the interior liner of a tire, which method minimally comprises the following steps: holding the tire immovable so that a selected surface portion thereof is in a desired angular location above bottom dead center; spreading the beads of the tire proximate the portion to be cleaned to expose the liner; supplying solvent to the selected surface portion; and brushing the selected tire portion, thereby to clean the selected portion of the liner. If desired, the method may comprise the additional step of directing a flow of air on the cleaned selected surface portion to dry the same. This method may optionally include the additional step of withdrawing solvent accumulating at the bottom of the tire. Moreover, if desired, the method may further include the additional step of discharging a substance from a nozzle on the selected surface portion, and moving the nozzle along the selected portion to distribute the discharged substance therealong.

While the present invention has been schematically illustrated and described as including a number of actuators, it will be appreciated that the invention further comprises necessary piping, valving and the like (not shown) for operating these actuators in the manner described. Moreover, inasmuch as the method performed by the inventive apparatus comprises a number of sequential operations, such actuator piping and valving may preferably include a logic system so that the various sequence of operations will be performed automatically.

While the presently preferred embodiment of the apparatus has been shown and described, it will be appreciated by persons skilled in this art that other forms achieving like objects and advantages might also be adopted without departing from the scope of the invention which is generically defined by the following claims.

What is claimed is:

1. Apparatus for cleaning a selected surface portion of the interior liner of a tire, comprising:
   a frame;
   first holding means mounted on said frame and selectively operable to hold said tire immovable at a desired angular position and to spread the beads of said tire proximate said selected surface portion to be cleaned;
   a brush;
   brush moving means mounted on said frame and selectively operable to bring said brush into engagement with said selected surface portion and to move said brush relative to said selected surface portion while so engaged to scrub said selected surface portion;
   a source of cleaning solvent;
   supplying means selectively operable to withdraw solvent from said source and to supply such withdrawn solvent to said selected surface portion;
   a drain conduit having an open end;
   drain conduit moving means mounted on said frame and selectively operable to move said drain conduit to engage the bottom of said liner;
   a reversible pump operatively arranged in said drain conduit and adapted to pump solvent appearing at said conduit open end through said drain conduit;
   accumulator means operatively associated with said drain conduit to receive solvent pumped by said pump and adapted to store a fractional portion of such pumped solvent;
   whereby the operation of said pump may be reversed to flood said liner through said drain conduit with solvent retained in said accumulator means.

2. The apparatus as set forth in claim 1 wherein said first holding means comprises three cooperative fingers insertable into the hole of said tire, and means for mutually spreading said fingers to engage the beads of said tire.

3. The apparatus as set forth in claim 1 wherein said supplying means includes a nozzle arranged to spray such withdrawn solvent on said selected surface portion.

4. The apparatus as set forth in claim 1 and further comprising:
   drying means including a nozzle mounted on one of said fingers, said drying means being selectively operable to discharge a flow of air through said nozzle on said selected surface portion to dry said selected surface portion.

5. The apparatus as set forth in claim 1 and further comprising:
   second holding means mounted on said frame and selectively operable to hold another tire immovable and to spread the beads of such other tire proximate a selected surface portion thereof to be cleaned.

6. The apparatus as set forth in claim 5 and further comprising:
   a carriage mounted on said frame and adapted to be moved between a first position proximate said first holding means and a second position proximate said second holding means, and wherein said brush and said brush moving means are mounted on said carriage for movement therewith.

7. The apparatus as set forth in claim 5 and further comprising:
   applying means mounted on said frame and selectively operable to apply a substance to such cleaned selected surface portion, said applying means including a source of said substance, discharge means selectively operable to withdraw substance from said source and to discharge such withdrawn substance, and means for selectively moving said discharge means into said tire so that said substance will be discharged on such cleaned selected surface portion, and means for translating said discharge means along said cleaned surface selected portion.

8. The apparatus as set forth in claim 7 wherein said applying means is carried by a swingable carriage mounted on said frame, and wherein said swingable carriage may be moved to a first position proximate said first tire to apply said substance to a cleaned selected portion thereof, or moved to a second position proximate said second tire to apply said substance to a cleaned selected portion thereof.

* * * * *